United States Patent
Ali et al.

(10) Patent No.: US 8,769,184 B2
(45) Date of Patent: *Jul. 1, 2014

(54) SYSTEM AND METHOD TO PRIORITIZE LARGE MEMORY PAGE ALLOCATION IN VIRTUALIZED SYSTEMS

(71) Applicant: VMware, Inc., Palo Alto, CA (US)

(72) Inventors: Qasim Ali, Santa Clara, CA (US); Ravisprasad Mummidi, Mountain View, CA (US); Vivek Pandey, Bangalore (IN); Kiran Tati, Santa Clara, CA (US)

(73) Assignee: VMware, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/753,322

(22) Filed: Jan. 29, 2013

(65) Prior Publication Data

US 2013/0205062 A1 Aug. 8, 2013

Related U.S. Application Data

(63) Continuation of application No. 12/915,236, filed on Oct. 29, 2010, now Pat. No. 8,364,932.

(51) Int. Cl.
 *G06F 12/00* (2006.01)
 *G06F 13/00* (2006.01)
 *G06F 13/28* (2006.01)
 *G06F 9/30* (2006.01)
 *G06F 9/40* (2006.01)
 *G06F 9/46* (2006.01)

(52) U.S. Cl.
 USPC ............... 711/6; 711/204; 711/206; 718/104

(58) Field of Classification Search
 USPC ............... 711/6, 202–208; 718/104
 See application file for complete search history.

(56) References Cited

U.S. PATENT DOCUMENTS

| | | | |
|---|---|---|---|
| 2005/0097298 A1* | 5/2005 | Cohen | 711/206 |
| 2007/0136506 A1* | 6/2007 | Traut et al. | 711/6 |
| 2009/0182976 A1* | 7/2009 | Agesen | 711/207 |
| 2010/0106930 A1* | 4/2010 | Foltz et al. | 711/165 |
| 2011/0016290 A1* | 1/2011 | Chobotaro et al. | 711/207 |

* cited by examiner

*Primary Examiner* — Ryan Bertram

(57) ABSTRACT

The prioritization of large memory page mapping is a function of the access bits in the L1 page table. In a first phase of operation, the number of set access bits in each of the L1 page tables is counted periodically and a current count value is calculated therefrom. During the first phase, no pages are mapped large even if identified as such. After the first phase, the current count value is used to prioritize among potential large memory pages to determine which pages to map large. The system continues to calculate the current count value even after the first phase ends. When using hardware assist, the access bits in the nested page tables are used and when using software MMU, the access bits in the shadow page tables are used for large page prioritization.

28 Claims, 10 Drawing Sheets

| PPN 302 | A 304 | U 306 | X 308 | W 310 | R 312 | D 314 | P 316 | STOP BIT 318 |

| | 702 | 704 |
|---|---|---|
| | LARGE PAGE HASHED ADDR | CURRENT COUNT VALUE |
| 706 — | LHA-1 | CCV[i] |
| 708 — | LHA-2 | CCV[i] |
| | | |
| | LHA-n | CCV[i] |

FIG. 7A

| | 702 | 704 | 722 |
|---|---|---|---|
| | LARGE PAGE HASHED ADDR | CCV | CCV≥K |
| 724 — | LHA-1 | $CCV_1[i]$ | T/F |
| | | | |
| 726 — | LHA-n | $CCV_n[i]$ | T/F |

FIG. 7B

SYSTEM AND METHOD TO PRIORITIZE LARGE MEMORY PAGE ALLOCATION IN VIRTUALIZED SYSTEMS

CROSS-REFERENCE TO RELATED APPLICATIONS

This application is a Continuation of U.S. patent application Ser. No. 12/915,236, filed Oct. 29, 2010, which has issued as U.S. Pat. No. 8,364,932.

BACKGROUND OF THE INVENTION

In today's computers, as is well known to those of ordinary skill in the art, virtual memory decouples the address space of the running processes from the physical memory addresses. Virtual memory enables processes to have a large contiguous address space that is not limited by an underlying physical memory and allows the computer to run more processes than can fit simultaneously in their entirety in the available physical memory, i.e., to allow for an "over-commit" of memory. To do this, virtual memory space is divided into pages of a fixed size, typically 4 KB, with a size of 2 MB or greater being defined in this patent document as a "large" page. Each page of the virtual memory space maps onto a page within the physical memory.

In general, and not meant to be a complete description of current technology, an application accesses a virtual address (VA) that is translated into a physical address (PA) that is then used to access the physical memory. The translation produces what is called a linear address (LA). The LA is translated to the PA using hardware called a Memory Management Unit (MMU). If the system architecture does not support segmentation, then the LA is the same as the VA, and the VA is used by the MMU to translate to the PA.

As is well known, translation of a virtual memory address to a physical memory address is done by traversing page tables, located in RAM, that contain mapping information. To speed up the translation, a translation lookaside buffer (TLB) is typically used. The TLB provides a faster translation of virtual addresses to physical addresses than does accessing page tables in RAM because the TLB can provide the beginning-to-end mapping in a single step and because the TLB can be implemented in a small (and, therefore, fast to access) data structure closer to, or in, the CPU. The TLB is limited in size, however, and often a virtual memory page cannot be found in the TLB. Whenever this happens, a "TLB miss" occurs, and the mapping has to be performed by a traversal of the page tables, commonly known as a "page walk," a much slower process when compared to look-ups in the TLB.

The following is meant as a general explanation for background purposes only and may apply to a 64 bit architecture and a 4 KB page size as well as a 32 bit architecture with different page sizes. A more detailed discussion of translation processes can be found in "Intel 64 and IA-32 Architecture Application Note: TLBs, Paging-Structure Caches, and Their Invalidation" available from Intel Corp. of Santa Clara, Calif., the entirety of which is incorporated by reference for all purposes.

Referring to FIG. 1, with respect to the common x86 architecture, a MMU 100 consists of the following parts: a control register (CR3) 102, a translation lookaside buffer (TLB) 104, and translation circuitry, i.e., TLB fill hardware 106. The paging structures are: (a) 4 KB in size; (b) reside in main memory, generally separate from the MMU; and (c) are designated L4, L3, L2 and L1 page tables 108, 110, 112, 114, respectively. In some implementations, each of the page tables contains 512 8-byte entries comprising information required to perform the translation as will be described below in more detail.

As shown in FIG. 2, the hardware register CR3 102 contains the base address of the root page tables of the currently executing process. In four-level paging (long mode) each level points to the next lower level to, ultimately, determine the location of the backing memory page.

As is well known, an MMU 100 is typically equipped with one or more TLBs 104, where the TLB 104 is a cache of recent LPN (Linear Page Number) to PPN (Physical Page Number) translations. To translate an LA, the MMU 100 computes the LPN, and then looks in the TLB 104 for a translation of the LPN. If the translation is present in the TLB 104, referred to as a "TLB hit," the PPN is immediately available from the TLB 104. On the other hand, if the translation is not present in the TLB 104, referred to as a "TLB miss," a page table walk is done, and the translation is stored in the TLB, possibly evicting another entry from the TLB 104.

As shown in FIG. 3, a page table entry (PTE), e.g., PTE 201-$n$ includes multiple fields, or groups of bits, that represent: a physical page number (PPN) 302, a page accessed bit (A) 304, a user permission bit (U) 306, an execute permission bit (X) 308, a write permission (W) bit 310, a read permission (R) bit 312, a page dirty bit (D) 314, a page present bit (P) 316, and a stop bit 318. When a linear address is used to access memory, the processor sets the A-bit 304 to one (1) in all page table level entries used to translate the linear address. It should be understood that FIG. 3 illustrates one possible configuration of bits in a page table entry 201-$n$ and that the number and arrangement of the elements in a page table entry 201-$n$ can be varied from what is shown.

The PPN 302 indicates the next page in the page table hierarchy. If a particular PTE 201-$n$ is at the lowest level of the page table hierarchy, then the PPN 302 points to a data page. If a particular PTE 201-$n$ is not at the lowest level of the page table hierarchy, then the PPN 302 points to a lower-level page table.

The stop bit 318 is set to one (1) to indicate that the corresponding PTE 201-$n$ is at the lowest level of the page table hierarchy. As the size of the data pages may vary within a physical memory, the stop bit 318 may be set to one in PTEs 201-$n$ at various levels in the page table hierarchy. In this fashion, the page walk may be stopped so that one or more levels in the page table hierarchy are not traversed when mapping a large data page that is not in the TLB 104. At level L1 in the page tree hierarchy, i.e., the lowest level that the page table hierarchy supports, the stop bit 318 is ignored.

As shown in FIG. 4, the virtual address 402 is subdivided into five fields: a level four index 404, a level three index 406, a level two index 408, a level one index 410, and an offset 412. The virtual address 402 may include additional bits or fields that are not used during the mapping of virtual memory addresses to physical memory addresses. Each of the index fields 404-410 and the offset field 412 may include any number of bits as may be appropriate for a given computer system. Typically, the subdivision of the virtual address 402 reflects the number of levels supported by the page walker or TLB fill hardware 106, the size of the smallest available physical pages, the size of the virtual memory address space, and the size of the physical memory address space.

In walking the page tables, the page table root CR3 102 is used to determine that the L4 page table is the page table 108. The L4 index 404 is used to index into the page table 108, thereby obtaining an L4 PTE. The PPN 302 stored in this L4 PTE is used to determine the L3 page table 110. The L3 index 406 is used to index into the page table 110, thereby obtaining an L3 PTE. The PPN 302 stored in this L3 PTE is used to determine the L2 page table 112. The L2 index 408 is used to index into the L2 page table 112 thereby obtaining an L2 PTE. The PPN 302 stored in this L2 PTE is used to determine the level one page table 114. The L1 index 410 is used to index into the L1 page table 114, thereby obtaining an L1 PTE. The PPN 302 stored in this level one PTE is used to access the data page 204-$n$. Subsequently, the offset 412 is used to index into the data page 204-$n$, thereby accessing the data corresponding to the virtual address 410. In addition, the pair consisting of the virtual page number corresponding to the index fields 404-410 and the physical page number corresponding to the data page 204-$n$ is entered into the TLB 104.

If the stop bit 318 is set in a PTE 201-$n$ that is accessed at a higher level in the page table hierarchy, then the PPN 302 in the corresponding PTE 201-$n$ is used to access a large data page. A system would then index into the large data page using a composition of the remaining index bits of the virtual address 402 and the offset bits 412, thereby accessing the data corresponding to the virtual address 402. In addition, the large page mapping is entered into the TLB 104.

As is well known, virtualizing a MMU so that multiple virtual machines can run on a single hardware system typically entails another level of translation. The first translation is provided by a guest operating system (guest OS) running in a virtual machine. The guest OS translates a guest LPN (GLPN) into a corresponding guest PPN (GPPN) in the conventional manner. The second translation is provided by virtualization software, for example, a virtual machine monitor (VMM). In particular, the VMM maintains a GPPN to machine page number (MPN) mapping in its internal translation table (T) where the host PPN is used to address physical memory, i.e., the MPN. of the hardware system.

One of two methods is typically used for virtualizing an MMU, either a shadowing of guest paging structures (shadowing method), or a hardware assist method. As shown in FIG. 5, the shadowing method for virtualizing an MMU, virtualization software, for example, a virtual machine monitor VMM, maintains shadow page tables 502, with one shadow page table for each guest page table. While the guest page tables 504, maintained by the guest operating system, contain guest LPN to guest PPN mappings, the shadow page tables contain guest LPN to host PPN mappings. To insert a translation for a guest LPN into a shadow page table, the VMM walks the guest page table to determine the guest PPN. Then, it translates the guest PPN to a host PPN using its translation table T.

The architectural extensions introduced by AMD, with its Nested Page Tables (NPT), and Intel, with its Extended Page Tables (EPT), are leveraged in the hardware assist method of virtualizing an MMU. A general overview of hardware assist virtualization of an MMU can be found in the article "Accelerating Two-Dimensional Page Walks for Virtualized Systems," by Bhargava, et al., ASPLOS'08, Mar. 1-5, 2008, Seattle, Wash., the entire contents of which is hereby incorporated by reference for all purposes.

Memory pages of a larger size, typically 2 MB in an x86 system, are called large pages or super pages. Large pages are supported by many general purpose processors and allow each entry in the TLB to map a large physical memory region into a virtual address space. This increases the TLB reach, i.e., the amount of memory that can be accessed without causing a TLB fault, thereby decreasing the TLB misses, which translates into performance increases for many applications.

One issue presents itself with the use of large pages—the problem of determining which pages to map large, as large pages are a scarce resource. For a system with a VMM using shadow page tables or software MMU, the cost of figuring out which pages to map large should be relatively small in order to gain the maximum benefit. Currently, in a shadow MMU, i.e., a software MMU, large pages are assigned based on the order in which the pages fault. The order of the faulting pages, however, does not necessarily indicate that a page is a good candidate to be backed by a large page.

Using large pages reduces the number of TLB misses and generally improves performance of virtual memory systems. The use of large pages, however, also generally reduces the ability of an operating system to efficiently utilize the physical memory. As large pages pose this inherent tradeoff between fast memory access, and the accompanying increase in performance, and efficient utilization of physical memory, large pages are not typically used universally. Therefore, it is important to optimize their use and deploy them in a manner that will deliver the biggest performance improvement. The optimization of the use of large memory pages is beneficial in both the shadowing of guest paging structures (shadowing method) and the hardware assist method.

BRIEF SUMMARY OF THE INVENTION

In a computer system that utilized both guest page tables and corresponding shadow page tables or hardware assist nested page tables, a method of selectively mapping shadow memory pages or nested page tables as large includes determining whether a particular guest memory page associated with the particular guest page table is mapped large and, if so, whether a count which is indicative of the access fields that are set within the shadow page tables or hardware assist nested page tables corresponding to the guest memory page exceeds a threshold. If the particular guest memory page is mapped large and the count exceeds the threshold, mapping a shadow page or nested page table as large within a shadow page table that corresponds to the particular guest page table.

In one embodiment, in a computer system having a virtual memory system with a plurality of page tables including a plurality of lowest level (L1) page tables, a method of prioritizing large memory page mapping includes periodically calculating and storing a current count value, CCV[i], corresponding to a number, $N_{sa}$, of currently set access bits in each L1 page table. After a first time period has expired, and upon detection of a page fault corresponding to a faulted memory page, if the faulted memory page is mapped large in a guest OS, then if a stored current count value CCV[i] corresponding to the faulted memory page is greater than a predetermined threshold value K, a corresponding shadow memory page is mapped as large in a shadow page table structure or nested page tables.

BRIEF DESCRIPTION OF THE SEVERAL VIEWS OF THE DRAWINGS

Various aspects of at least one embodiment of the present invention are discussed below with reference to the accompanying figures. In the figures, which are not intended to be drawn to scale, each identical or nearly identical component that is illustrated in the various figures is represented by a like numeral. For purposes of clarity, not every component may be labeled in every drawing. The figures are provided for the purposes of illustration and explanation and are not intended as a definition of the limits of the invention. In the figures:

FIG. 3 is a representation of the fields of a page table entry;

FIGS. 7A and 7B are data structures used in embodiments of the present invention.

DETAILED DESCRIPTION OF THE INVENTION

Excessive use of platform large pages can make memory resource management techniques such as page sharing, swapping, and the like, difficult and much less efficient. Thus, it is important to be selective in choosing when and where to use platform large pages to gain the best performance/consolidation benefits.

Embodiments of the present invention propose using page table access bits to prioritize among known guest large page candidates when mapping with platform large pages in order to gain an improved performance/consolidation benefit.

Embodiments of the present invention implement heuristics/schemes that are based on traversing shadow page tables or nested page tables to find those L1 pages that can be remapped as a respective large page. As above, the heuristics are based on the access bits and the determination as to whether or not to map a page large is a function of the number of access bits that are set in an L1 page. Rather than mapping pages large in the order of faults, candidate L1 pages (2 MB) in the shadow page tables or nested page tables are identified. The corresponding 512 pages (512 @ 4 KB) or PPNs, can then be mapped as a large page.

Thus, instead of providing large pages based on the order in which pages fault, information is gathered from the shadow page tables or nested page tables and used to decide which pages to map large. Advantageously, embodiments of the present invention do not require changes to the structure of the page table entries and/or the hardware as are currently known and implemented.

Generally, and as an overview, embodiments of the present invention implement a two phase approach to determining whether or not to keep pages large. In the first phase, i.e., a "warm-up" phase, information regarding a current number of set access bits is gathered periodically from each of the L1 page tables. It may be considered that the warm-up phase is used to "seed" the system with initial data. Subsequent to the warm-up phase, a calculated count of the access bits in an L1 page table is used to prioritize among the large pages to determine how to gain the best performance/consolidation benefit. When using hardware assist, the access bits in the nested page tables are used and when using software MMU, the access bits in the shadow page tables are used for the prioritization algorithm. As will be described below, the current count number is continually periodically calculated.

Figure 1:
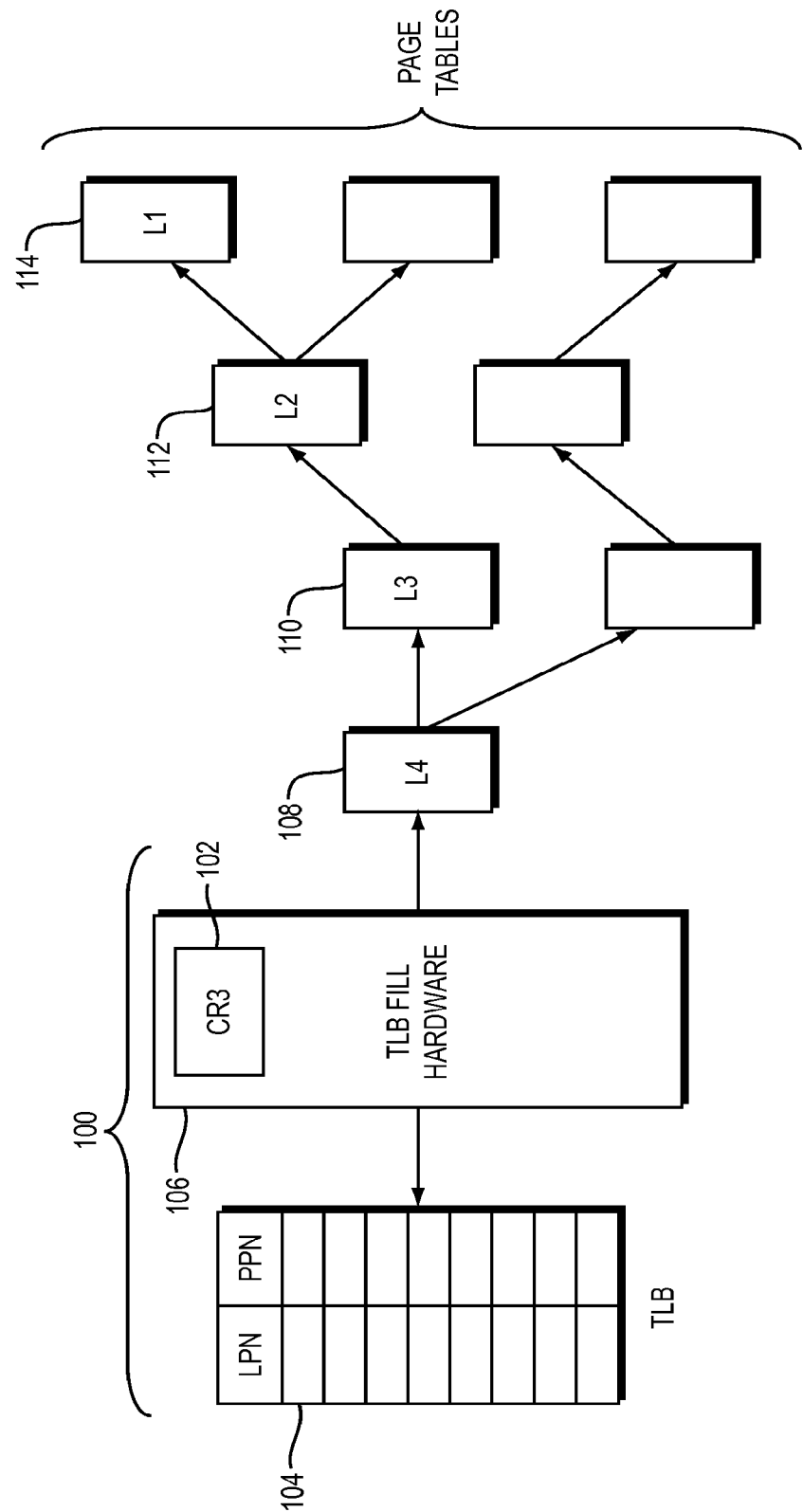
FIG. 1 is a block diagram of a known MMU and page table structure.
Figure 2:
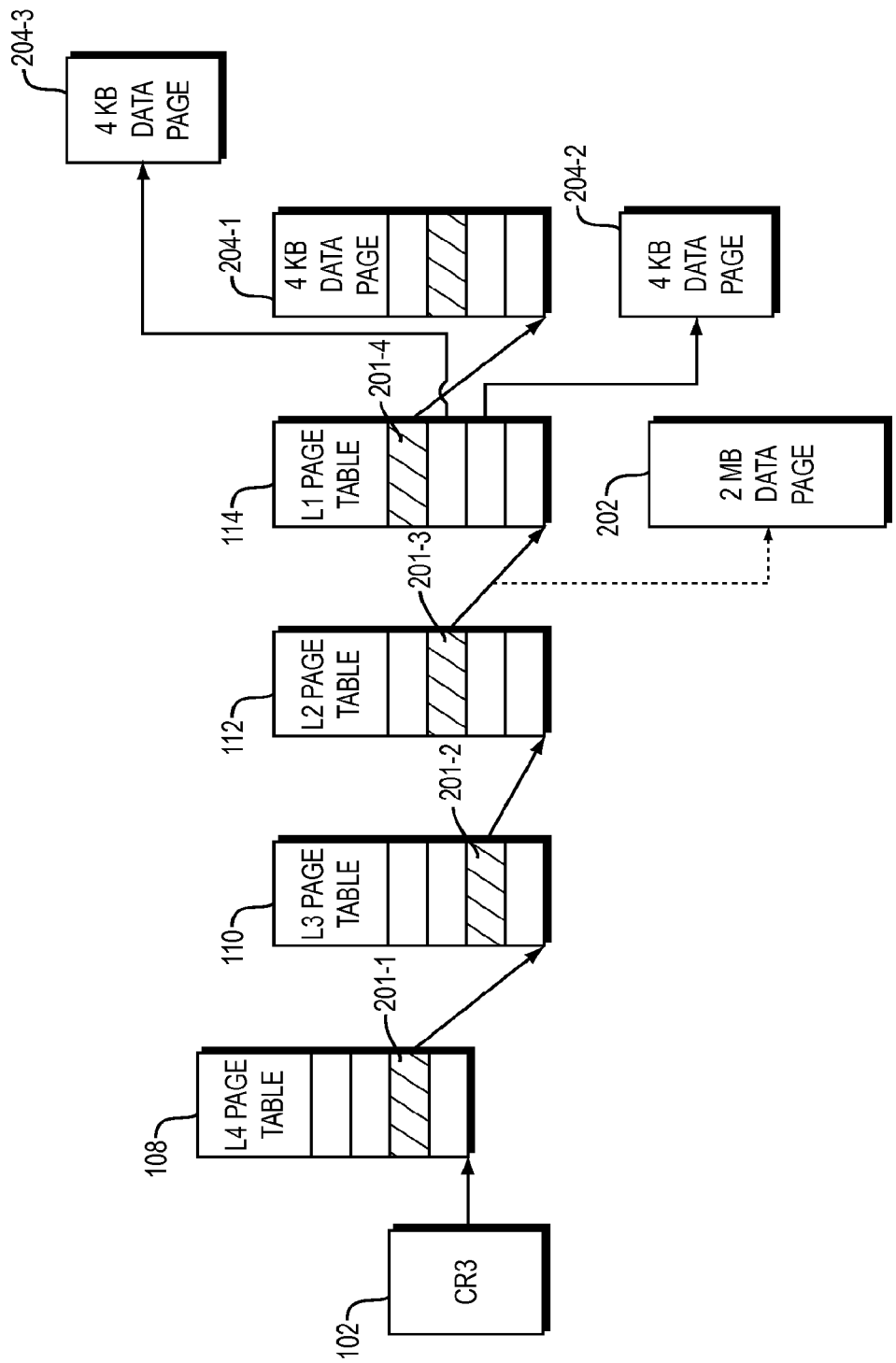
FIG. 2 is a representation of a multilevel page table structure.
Figure 4:
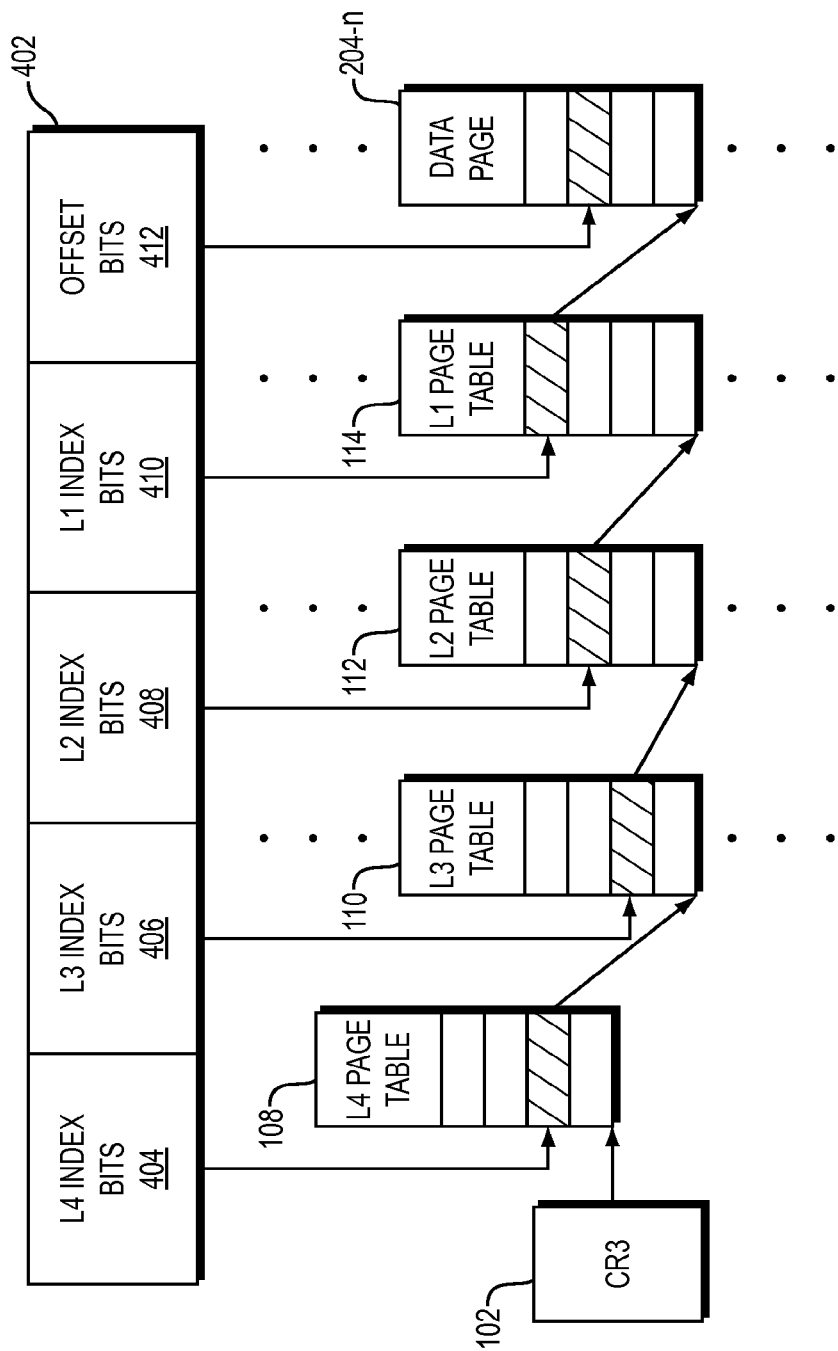
FIG. 4 is a representation of a virtual address being walked through a page table structure.
Figure 5:
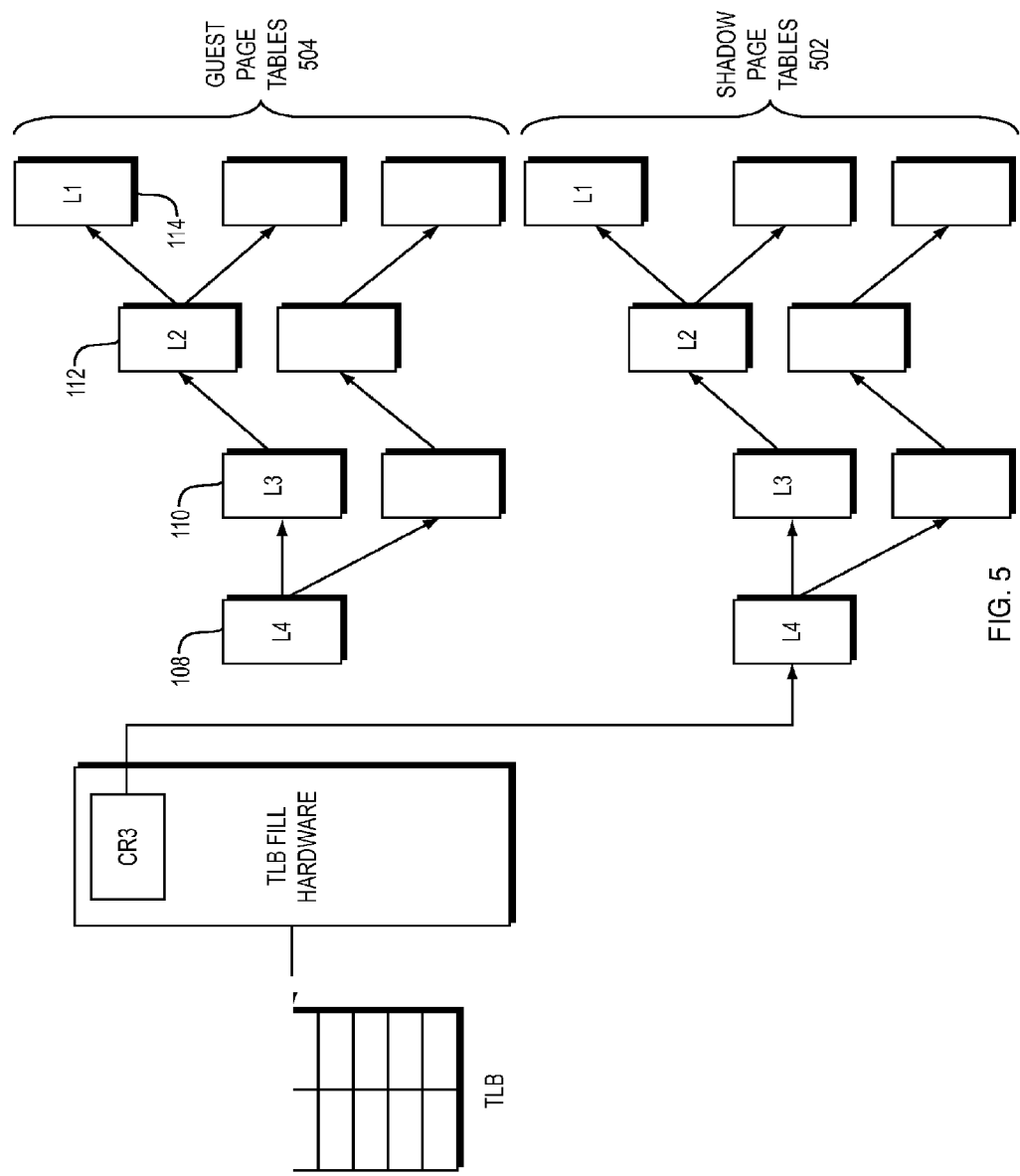
FIG. 5 is a block diagram of guest page tables and shadow page tables in a virtualized system.
Figure 6:
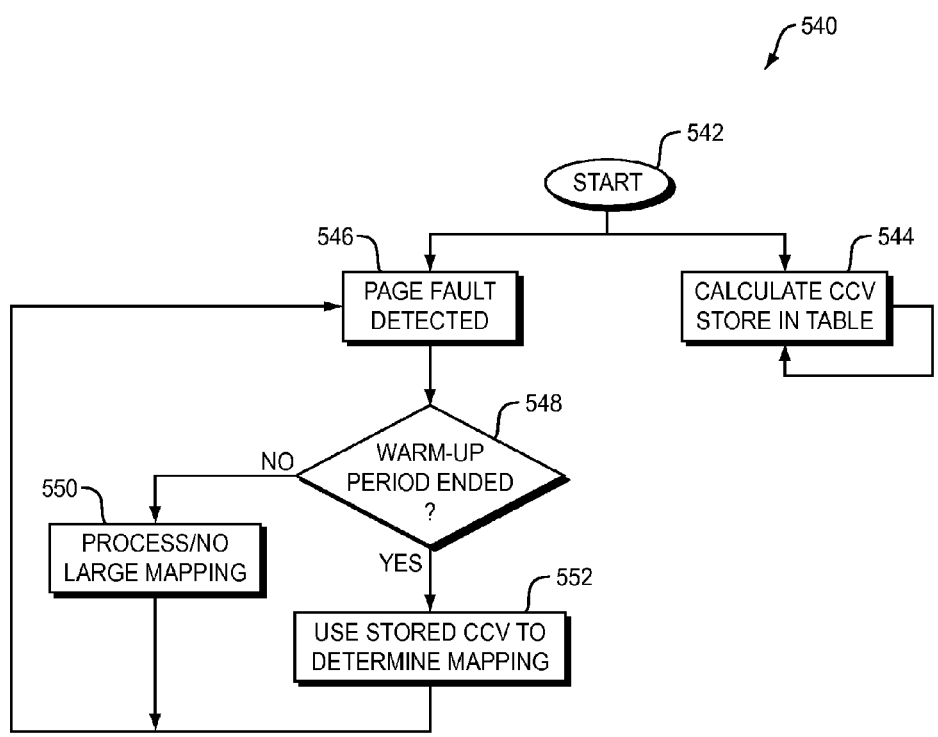
FIGS. 6, 6A and 6B are flowcharts of a method in accordance with one embodiment of the present invention.

As an overview, in one embodiment of the present invention, referring now to FIG. 6, a method 540 begins, step 542, with a current count value CCV being calculated and stored in a table, step 544. The calculation of the current count value CCV occurs periodically as will be described in more detail below.

At the same time, step 546, when a page fault is detected, it is then determined, step 548, whether or not the warm-up period has expired or ended, step 548. If the warm-up period has not expired, then control passes to step 550 where the page fault is processed but no large pages are mapped, even if the faulting page is large.

If, on the other hand, the warm-up period has ended, then control passes to step 552 where the current count value, if there is one, for the faulting page is used to determine whether or not to map a page large.

Figure 6A:
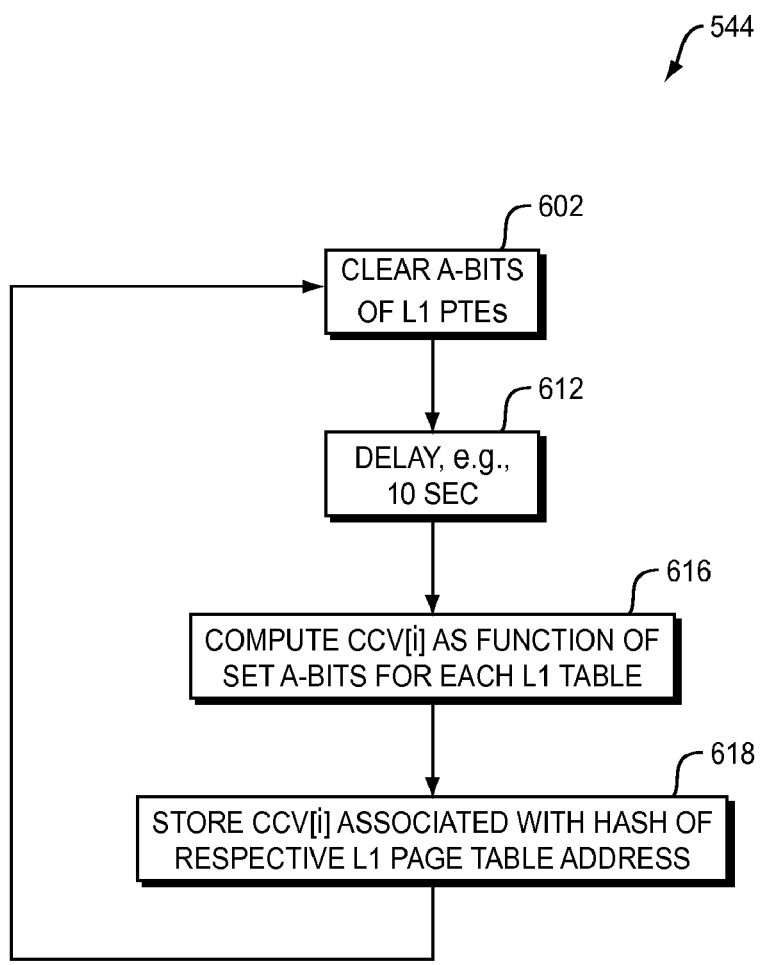

Referring now to FIG. 6A, step 544 includes clearing the A-bits of the L1 level page tables, step 602. Once the A-bits are cleared, a predetermined delay, in one embodiment about 10 seconds, is implemented, step 612. Once the delay period has ended, then a current count value CCV[i] is determined as a function of the current total number of set A-bits in each of the L1 page tables, step 616.

The current count value CCV[i] is, in one embodiment of the present invention, determined every ten seconds over a warm-up period of about 120 seconds. Generally, the warm-up period may be from 60-300 seconds with sampling at least 12 times during that period. The current count value CCV may be determined multiple times and computed using an exponential average method. One suitable formula for computing the current count value CCV[i] is:

$$CCV[i] = (1-\alpha)*CCV[i-1] + \alpha*N_{sa}$$

Where $\alpha$ is a constant that satisfies the condition $0 \leq \alpha \leq 1$, and where $N_{sa}$ is the current number of set A-bits.

Thus, a current count value CCV[i] is based on a percentage $(1-\alpha)$ of the prior count value CCV[i-1] plus a percentage $(\alpha)$ of the current number of set A-bits, $N_{sa}$, in the L1 page.

In one example, with 512 L1 page table entries, the maximum number of A-bits that can be set for a given L1 page table is, therefore, 512 (i.e., $N_{sa} \leq 512$). To calculate the current count value CCV[i], the total number of A-bits that are set, $N_{sa}$, out of the 512 L1 page table entries, is determined and then used in the formula to determine the current count value CCV[i].

This current count value CCV[i] is stored, step 618, in a CCV table 700 that has a structure, in one embodiment of the present invention, as shown in FIG. 7A. Thus, each time the current count value CCV[i] is calculated, it is written over the previous value in the CCV table 700.

The CCV table 700 consists of a large page hashed address field 702 and a current count value field 704. Each entry 706, 708 has a large page hashed address LHA and a corresponding current count value CCV[i]. The hash is calculated over the large page region linear address corresponding to the L1 page table. When an appropriate hash function is used, every large page linear address should reduce to a unique hash value. This reduces the amount of memory space necessary to store the CCV table 700 and speeds up the searching of the table, as will be described below.

Returning to the method 540, as shown in FIG. 6, generally, when a page fault now occurs, the fault handler, once having determined that the guest linear address space region corresponding to the fault is mapped large, looks for an entry in the CCV table 700 corresponding to a hash of the guest linear address. This is represented by step 552.

A large memory page is then used in the shadow page tables for the linear address region or guest physical address region in the nested page tables, if and only if:

1) a match is found for the large page address in the CCV table 700, 2) the corresponding current count value CCV[i] is greater than a pre-determined threshold value K, where, in one embodiment, the threshold value K is set to 320 and 3) the large memory page region does not contain candidate small pages that would be better used for other memory resource management features such as, for example, but not limited to, page sharing, ballooning, and the like.

Figure 6B:
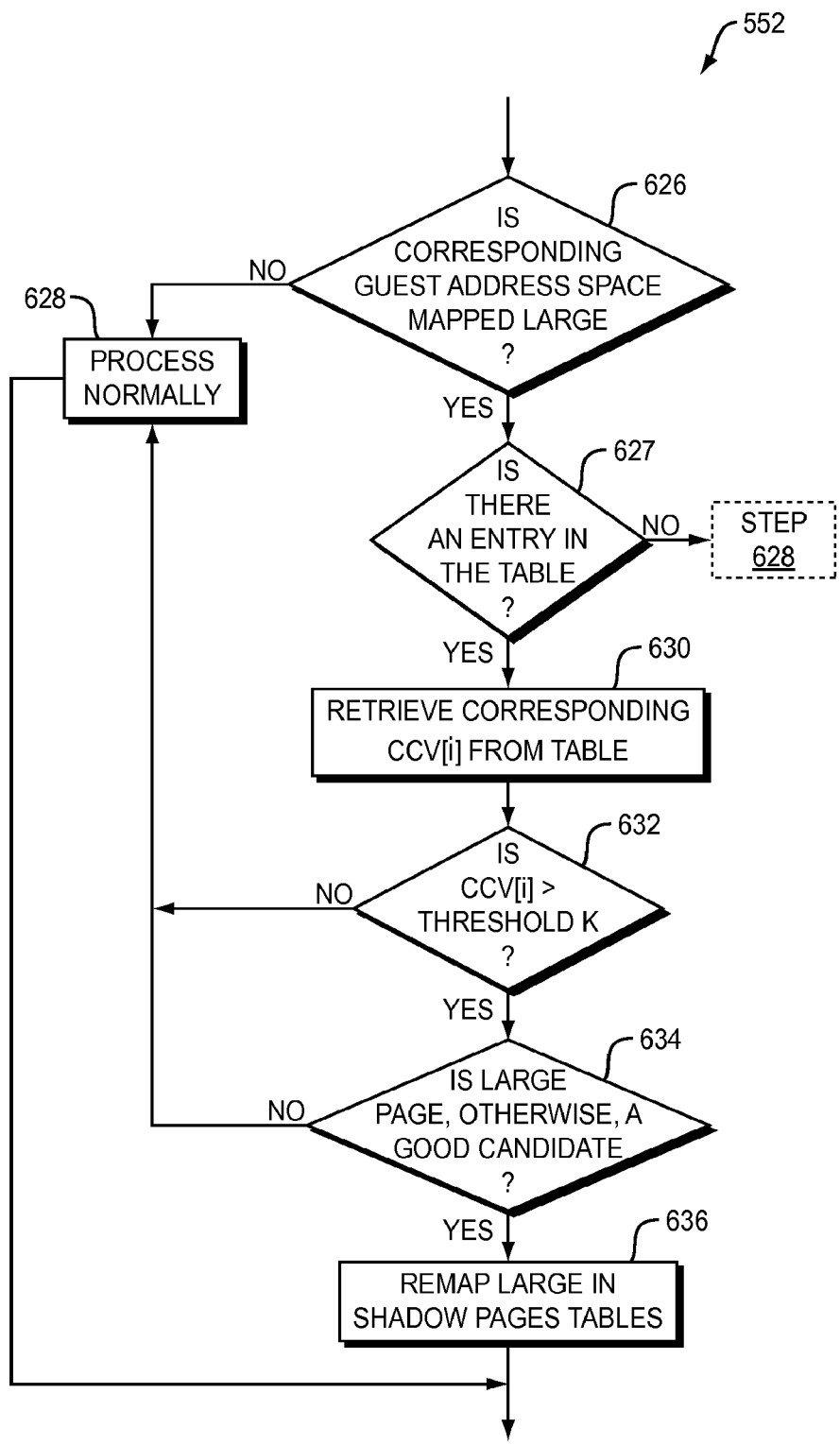

In more detail for one embodiment of operations at process 552, referring now to FIG. 6B, at step 626 it is determined whether or not the corresponding guest address space is mapped large. If the space is not mapped large, then control passes to step 628 for normal processing, i.e., as known in the current state of the art. After which, control passes back to step 546 to wait for the next page fault to be detected.

If, at step 626, it is determined that it is a large guest address space mapping, control passes to step 627 to determine if there is a corresponding entry in the CCV table 700. If no entry is found, based on the hashed value of the address corresponding to the large guest address space, control passes to step 628.

On the other hand, a positive determination at step 627 passes control to step 630, where the corresponding current count value CCV[i] is retrieved from the CCV table 700.

At step 632, the current count value CCV[i] is compared to the predetermined threshold value K and if the current count value CCV[i] is not greater than the threshold value K, control passes to step 628 for normal processing, i.e., no large page mapping. Otherwise, control passes to step 634 where it is determined if the large memory page is still a good candidate considering other memory resource management features that may be implemented over the proposed large memory page. If the large memory page is not a good candidate, control passes to step 628 for normal page mapping processing.

If the determination at step 634 is that the large page remains a good candidate, then control passes to step 636 for remapping of the small pages in the shadow page tables of the VMM. It should be noted that the remapping of small pages to a large page is known to those of ordinary skill in the art.

One embodiment of the present invention was implemented on a system running with a software MMU but as detailed above, may also be used on a system running with hardware MMU as well. In one embodiment of the present invention, the course of action the VMM takes when assigning a large page on a page fault is changed from that which is known by identifying large page candidates when the hypervisor incurs hidden page faults. Rather than immediately mapping shadow page tables with platform large pages, the large page region is included in the list of large page candidates. Once the warm-up phase, chosen to be 120 seconds, is complete, the determination of whether or not to map a page large is carried out as set forth above. It should be noted that the duration of the warm-up phase and the frequency of calculating the current count value can be varied and tuned in accordance with desired operating parameters.

In addition, embodiments of the present invention also provide for the VMM/monitor to map a large page at any time and it is not tied to any event in the guest. Whether the shadowing or the hardware assist method is being used, because the VMM/monitor maintains separate structures, shadow page table pages in shadowing and a second level page table in hardware-assist, the VMM/monitor can map pages as small page or large page irrespective of how they are mapped by the guest in its page tables. Advantageously, the VMM/monitor can choose at any time to change these mappings from small to large or vice versa in addition to determining which pages to map as large.

Embodiments of the present invention may be implemented on the ESX server available from VMware Corporation of Palo Alto, Calif.

It should be noted that in the above-described formula for determining the current count value CCV[i], choosing $\alpha=1$ reduces the current count value to be equal to the number of A-bits in the L1 page table that are set without any weight given to the prior value CCV[i−1].

In addition, in the embodiment described above, only the most recent count value CCV[i] is stored in the CCV table 700. In an alternate embodiment, not shown in the Figures, some number of the previous count values CCV[i−1], CCV[i−2] . . . CCV[i−n] may be stored in the table or other type of structure, depending upon the algorithm used to ultimately determine the count parameter. Of course, more fields require more memory dedicated to this purpose. In addition, depending upon the computing resources available, an additional field could be provided in the CCV table 700 to indicate if a corresponding entry is greater than the threshold value K, as shown in FIG. 7B. Thus, the determination at step 632 could be replaced with an analysis of whether or not this particular field has been set, which may be a faster determination than the comparison shown in the embodiment above. One of ordinary skill in the art will understand that other refinements are also possible.

The above detailed description of the various embodiments of the invention assumed the reader's familiarity with virtualization; nevertheless, the following provides some background relating to virtualization technology. It should be appreciated that one or more embodiments of the present invention may be implemented wholly or partially in hardware, for example and without limitation, in processor architectures intended to provide hardware support for VMs.

Although this specification describes translation processes for Intel processors, the details are similar for other popular x86 based processors, and embodiments of the invention may be implemented on any x86 or non-x86 based processor that supports virtual memory.

Figure 8:
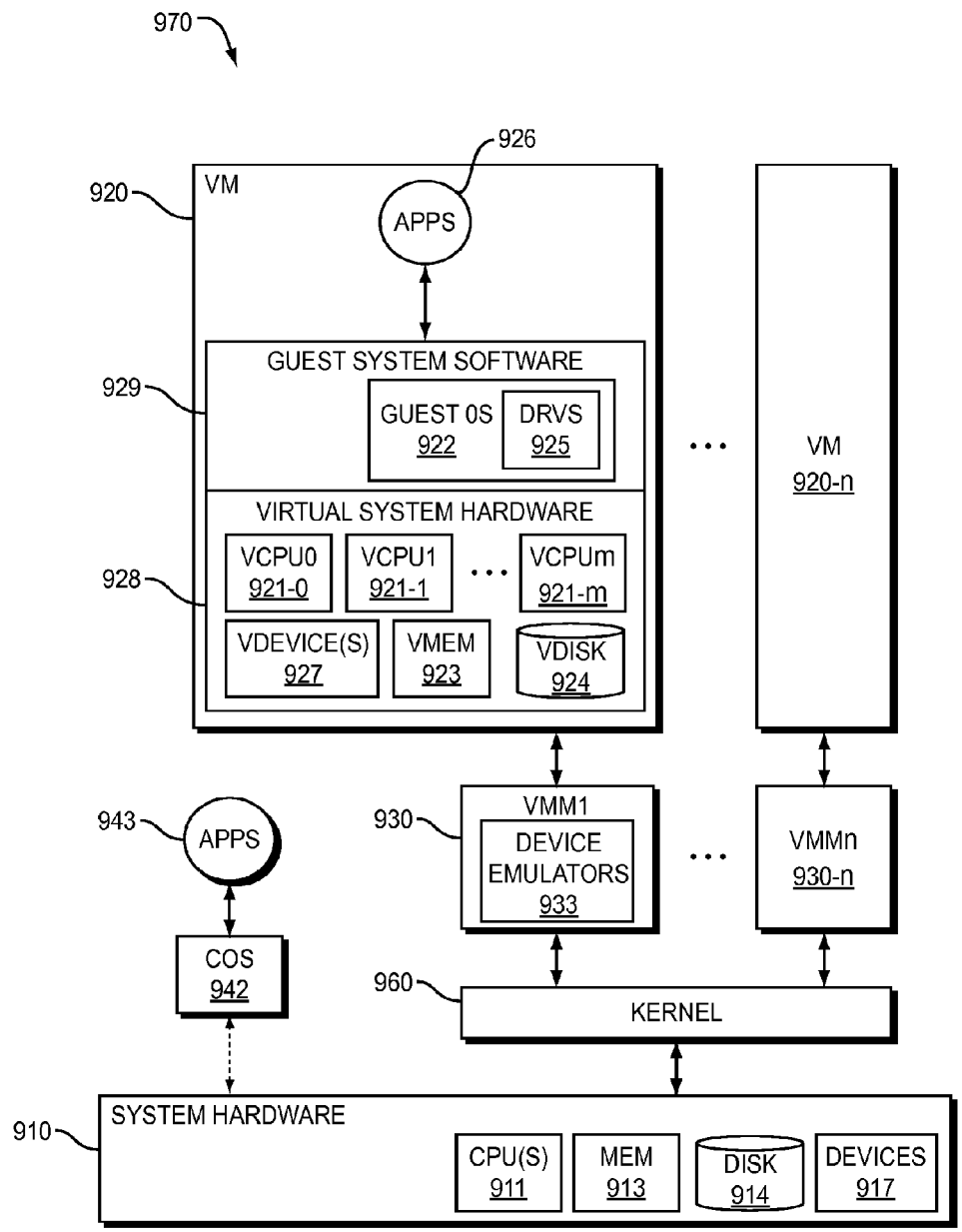
FIG. 8 is a block diagram representation of a known virtualization system.

As is well known in the field of computer science, a virtual machine (VM) is an abstraction—a "virtualization"—of an actual physical computer system. One possible arrangement of computer system 970 that implements virtualization is shown in FIG. 8. A virtual machine (VM) or "guest" 920 is installed on a "host platform," or simply "host," which will include system hardware, that is, hardware platform 910, and one or more layers or co-resident components comprising system-level software, such as an operating system or similar kernel, or a virtual machine monitor or hypervisor (see below), or some combination of these. The system hardware typically includes one or more processors 911, memory 913, some form of mass storage 914, and various other devices 917.

Each VM 920, . . . , 920-$n$ will typically have virtual system hardware 928 and guest system software 929. The virtual system hardware includes at least one virtual CPU, virtual memory 923, an optional virtual disk 924, and one or more virtual devices 927. Note that a disk virtual or physical—is also a "device," but is usually considered separately because of the important role of the disk. All of the virtual hardware components of the VM may be implemented in software using known techniques to emulate the corresponding physical components. The guest system software includes guest operating system (OS) 922 and drivers 925 as needed for the various virtual devices 927.

Note that a single VM may be configured with more than one virtualized processor; as illustrated in FIG. 8, with multiple virtual processors 921-0, 921-1, . . . , 921-$m$ (VCPU0, VCPU1, . . . , VCPUm) within VM 920. For example, symmetric multi-processor (SMP) systems exist wherein a hardware platform with multiple processors are connected to a shared main memory and shared devices. Similarly, VMs may be configured as SMP VMs. In addition, multi-processor systems exist in a so-called "multi-core" architecture, wherein more than one physical CPU is fabricated on a single chip and has its own set of functional units (such as a floating-point unit and an arithmetic/logic unit ALU), and where threads can be executed independently; multi-core processors typically share limited resources, such as some cache—VMs may be configured as multi-core systems. In addition, VMs may be configured to enable simultaneous execution of multiple threads in which more than one logical CPU operates simultaneously on a single chip, but in which the logical CPUs flexibly share one or more resources such as caches, buffers, functional units, and the like. One or more embodiments of the present invention may be used regardless of the type—physical and/or logical—or number of processors included in a VM.

Some interface is generally required between the guest software within a VM and various hardware components and devices in the underlying hardware platform. This interface—which may be referred to generally as "virtualization software"—may include one or more software components and/or layers, possibly including one or more of the software components known as "virtual machine monitors" (VMMs), "hypervisors," or virtualization "kernels." Because virtualization terminology has evolved over time and has not yet become fully standardized, these terms do not always provide clear distinctions between the software layers and components to which they refer. For example, the term "hypervisor" is often used to describe both a VMM and a kernel together, either as separate but cooperating components or with one or more VMMs incorporated wholly or partially into the kernel itself; however, the term "hypervisor" is sometimes used instead to mean some variant of a VMM alone, which interfaces with some other software layer(s) or component(s) to support the virtualization. Moreover, in some systems, some virtualization code is included in at least one "superior" VM to facilitate the operations of other VMs. Furthermore, specific software support for VMs may be included in a host OS itself; moreover, there may also be specific support for virtualization in the system hardware. Unless otherwise indicated, embodiments of the present invention may be used in virtualized computer systems having any type or configuration of virtualization software.

Virtual machine monitors 930, . . . , 930-*n* appear, as shown in FIG. 8, as separate entities from other components of the virtualization software. Some software components used to implement one illustrated embodiment of the invention are shown and described as being within a "virtualization layer" located logically between all virtual machines and the underlying hardware platform and/or system-level host software. This virtualization layer can be considered part of the overall virtualization software, although it would be possible to implement at least part of this layer in specialized hardware. Unless otherwise indicated, embodiments of the present invention may be used in virtualized computer systems having any type or configuration of virtualization software. Moreover, embodiments of the present invention are described and illustrated herein primarily as including one or more virtual machine monitors that appear as separate entities from other components of the virtualization software and perform certain functions relating to one or more embodiments of the present invention. This is only for the sake of simplicity and clarity of explanation and by way of illustration—as mentioned above, the distinctions are not always so clear-cut, and the use of the term virtual machine monitor or just VMM is meant to encompass any component(s) in the virtualization software that perform the described functions, regardless of what name they are given. Again, unless otherwise indicated or apparent from the description, it is to be assumed that embodiments of the present invention can be implemented anywhere within the overall structure of the virtualization software, and even in systems that provide specific hardware support for virtualization.

Various virtualized hardware components in the VM, such as the virtual CPU(s) VCPU0 921-0 to VCPUm 921-*m*, virtual memory 923, virtual disk 924, and virtual device(s) 927, are shown as being part of VM 920 for the sake of conceptual simplicity and ease of understanding. In actuality, these "components" are usually implemented as software emulations 933 included in VMM1 930.

Different systems may implement virtualization to different degrees—"virtualization" generally relates to a spectrum of definitions rather than to a bright line, and often reflects a design choice with respect to a trade-off between speed and efficiency on the one hand and isolation and universality on the other hand. For example, "full virtualization" is sometimes used to denote a system in which no software components of any form are included in the guest other than those that would be found in a non-virtualized computer; thus, the guest OS could be an off-the-shelf, commercially available OS with no components included specifically to support use in a virtualized environment.

In contrast, another concept, which has yet to achieve a universally accepted definition, is that of "para-virtualization." As the name implies, a "para-virtualized" system is not "fully" virtualized, but rather the guest is configured in some way to provide certain features that facilitate virtualization. For example, the guest in some para-virtualized systems is designed to avoid hard-to-virtualize operations and configurations, such as by avoiding certain privileged instructions, certain memory address ranges, etc. As another example, many para-virtualized systems include an interface within the guest that enables explicit calls to other components of the virtualization software.

For some, para-virtualization implies that the guest OS (in particular, its kernel) is specifically designed to support such an interface. According to this view, having, for example, an off-the-shelf version of Microsoft Windows XP as the guest OS would not be consistent with the notion of para-virtualization. Others define para-virtualization more broadly to include any guest OS with any code that is specifically intended to provide information directly to any other component of the virtualization software. According to this view, loading a module such as a driver designed to communicate with other virtualization components renders the system para-virtualized, even if the guest OS as such is an off-the-shelf, commercially available OS not specifically designed to support a virtualized computer system. Unless otherwise indicated or apparent, this invention is not restricted to use in systems with any particular "degree" of virtualization and is not to be limited to any particular notion of full or partial ("para-") virtualization.

In addition to the sometimes fuzzy distinction between full and partial (para-) virtualization, two arrangements of intermediate system-level software layer(s) are in general use—a "hosted" configuration and a non-hosted configuration (which is shown in FIG. 8). In a hosted virtualized computer system, an existing, general-purpose operating system forms a "host" OS that is used to perform certain input/output (I/O) operations, alongside and sometimes at the request of the VMM. The host OS, which usually includes drivers and supports applications of its own, and the VMM are both able to directly access at least some of the same hardware resources, with conflicts being avoided by a context-switching mechanism. The Workstation product of VMware, Inc., of Palo Alto, Calif., is an example of a hosted, virtualized computer system, which is also explained in U.S. Pat. No. 6,496,847 (Bugnion, et al., "System and Method for Virtualizing Computer Systems," 17 Dec. 2002).

In addition to device emulators, other components are also often included in the VMM of a hosted virtualization system; many of these components are found in the VMM of a non-hosted system as well. For example, interrupt/exception handlers may be included to help context-switching, and a direct execution engine and binary translator with associated a translation cache may be included to provide execution speed while still preventing the VM from directly executing certain privileged instructions.

The foregoing embodiments of the present invention may be implemented on one or more of the products available from VMware, Inc. of Palo Alto, Calif.

It is to be appreciated that embodiments of the methods and apparatuses discussed herein are not limited in application to the details of construction and the arrangement of components or steps set forth in the following description or illustrated in the accompanying drawings. The methods and apparatuses are capable of implementation in other embodiments and of being practiced or of being carried out in various ways. Examples of specific implementations are provided herein for illustrative purposes only and are not intended to be limiting. In particular, acts, elements and features discussed in connection with any one of the embodiments are not intended to be excluded from a similar role in any other embodiments. Also, the phraseology and terminology used herein are for the purpose of description and should not be regarded as limiting. The use herein of "including," "comprising," "having," "containing," "involving," and variations thereof, is meant to encompass the items listed thereafter and equivalents thereof as well as additional items.

Embodiments of the above-described invention may be implemented in all software, all hardware, or a combination of hardware and software, including program code stored in a firmware format to support dedicated hardware. A software implementation of the above described embodiment(s) may comprise a series of computer instructions either fixed on a tangible medium, such as a computer readable media, e.g., diskette, CD-ROM, ROM, or fixed disk or transmittable to a computer system in a carrier wave, via a modem or other interface device. The medium can be either a tangible medium, including but not limited to optical or analog communications lines, or may be implemented with wireless techniques, including but not limited to radio, microwave, infrared or other transmission techniques. The series of computer instructions whether contained in a tangible medium or a carrier wave embodies all or part of the functionality previously described herein with respect to the invention. Those skilled in the art will appreciate that such computer instructions can be written in a number of programming languages for use with many computer architectures or operating systems and may exist in machine executable format. It is contemplated that such a computer program product may be distributed as a removable media with accompanying printed or electronic documentation, e.g., shrink wrapped software, preloaded with a computer system, e.g., on system ROM or fixed disk, or distributed from a server over a network, e.g., the Internet or World Wide Web.

Although various exemplary embodiments of the present invention have been disclosed, it will be apparent to those skilled in the art that changes and modifications can be made which will achieve some of the advantages of the invention without departing from the general concepts of the invention. It will be apparent to those reasonably skilled in the art that other components performing the same functions may be suitably substituted. Further, the methods of the invention may be achieved in either all software implementations, using the appropriate processor instructions, or in hybrid implementations that utilize a combination of hardware logic and software logic to achieve the same results. Such alterations, modifications, and improvements are intended to be part of this disclosure and are intended to be within the scope of the invention. Accordingly, the foregoing description and drawings are by way of example only, and the scope of the invention should be determined from proper construction of the appended claims, and their equivalents.

What is claimed is:

1. A computer program product stored on a non-transitory computer readable medium and configured to perform a computer-implemented method of selectively mapping shadow memory pages as large in a system having a virtual memory system that utilizes both guest page tables and corresponding shadow page tables, the method comprising:

during a translation of virtual memory pages to physical memory pages, determining that a particular guest page table is a lowest level guest page table, wherein the particular guest page table comprises a plurality of table entries in which each table entry includes an access field that is set as a response to accessing a memory address associated with the table entry;

determining whether a particular guest memory page associated with the particular guest page table is mapped large;

determining whether a count which is indicative of the access fields that are set within the particular guest page table exceeds a threshold; and if the particular guest memory page is mapped large and the count exceeds the threshold, mapping a shadow page as large within a shadow page table that corresponds to the particular guest page table.

2. The computer program product of claim 1 wherein determining the count includes calculating a count value for a selected period of time.

3. A computer program product stored on a non-transitory computer readable medium and configured to perform a computer-implemented method of prioritizing large memory page mapping in a virtualized system running a guest operating system on hardware including a memory device, the virtualized system comprising a virtual machine monitor (VMM) maintaining a virtual memory system with a plurality of page tables including a plurality of lowest level (L1) page tables, the method comprising:

the VMM periodically calculating and storing a current count value (CCV[i]) as a function of a number (Nsa) of currently set access bits in each L1 page table; and subsequent to a first time period, and upon detection of a page fault corresponding to a faulted memory page, and upon a determination that the faulted memory page is mapped large in a guest OS, the VMM then determining, as a function of a stored current count value CCV[i] corresponding to the faulted memory page, whether or not to map a corresponding shadow memory page as large in a shadow page table structure.

4. The computer program product of claim 3, wherein the first time period starts at a same time as a first periodic calculation of the current count value CCV[i] begins.

5. The computer program product of claim 3, wherein determining whether or not to map the corresponding shadow page as large comprises:

the VMM retrieving a stored current count value CCV[i] corresponding to the faulted memory page;

the VMM comparing the retrieved current count value CCV[i] to a predetermined threshold value K; and if the retrieved current count value CCV[i] is greater than the predetermined threshold value K, the VMM mapping the corresponding shadow memory page as large in the shadow page table structure.

6. The computer program product of claim 5, further comprising the VMM clearing the set access bits in the L1 page table after calculating the corresponding current count value CCV[i].

7. The computer program product of claim 5, further comprising:

the VMM mapping the corresponding shadow memory page large only after determining that the corresponding large memory page does not interfere with memory page sharing.

8. The computer program product of claim 5, wherein each L1 page table consists of 512 page table entries, and wherein:

the predetermined threshold value K is at least 320.

9. The computer program product of claim 3, wherein the current count value CCV[i] for a corresponding L1 page table is calculated by the VMM as a function of a previously calculated count value CCV[i−1] for the same L1 page table.

10. The computer program product of claim 9, wherein the current count value CCV[i] is calculated by the VMM according to the formula:

$$CCV[i]=(1-\alpha)*CCV[i-1]+\alpha*Nsa,$$

where $0 \leq \alpha \leq 1$; and where CCV[i−1] is an immediately previous value of the current count value CCV.

11. The computer program product of claim 10, further comprising:

the VMM setting at least one of $\alpha$ and the predetermined threshold value K as a function of at least one of:

a number of page table entries in the L1 page table; and the other of $\alpha$ and the predetermined threshold value K.

12. The computer program product of claim 3, further comprising:

the VMM setting the first time period to be in a range of 60-300 seconds.

13. The computer program product of claim 12, further comprising:

the VMM periodically calculating and storing the current count value CCV[i] for each L1 page table at least 10-12 times during the first time period.

14. The computer program product of claim 3, further comprising:

the VMM storing the current count value CCV[i] with an identifier corresponding to the respective L1 page table.

15. The computer program product of claim 14, further comprising:

the VMM calculating the identifier of the corresponding L1 page table as a function of a virtual address.

16. The computer program product of claim 15, further comprising;

the VMM calculating the identifier of the corresponding L1 page table as a hash function applied to a virtual address of a large memory page related to the corresponding L1 page table.

17. The computer program product of claim 3, further comprising:

the VMM setting a first value as a predetermined number of calculated count values CCV to be obtained during the first time period; and the VMM spreading the calculation and storing of the predetermined number of calculated count values CCV for each L1 page table over the first time period.

18. A computer program product stored on a non-transitory computer readable medium and configured to perform a computer-implemented method of prioritizing large memory page mapping in a virtualized system running a guest operating system on hardware including a memory device, the virtualized system comprising a virtual machine monitor (VMM) maintaining a virtual memory system with a plurality of shadow page tables including a plurality of lowest level (L1) shadow page tables, the method comprising:

the VMM periodically calculating and storing a current count value CCV[i] as a function of a number Nsa of currently set access bits in each L1 shadow page table; and subsequent to a first time period, the VMM then determining, as a function of a stored current count value CCV[i] corresponding to a respective memory page, whether or not to map the respective memory page as large in the shadow page tables.

19. The computer program product of claim 18, wherein the first time period starts at a same time as a first periodic calculation of the current count value CCV[i] begins.

20. The computer program product of claim 18, wherein determining whether or not to map the respective memory page as large comprises:

the VMM retrieving a stored current count value CCV[i] corresponding to the respective memory page;

the VMM comparing the retrieved current count value CCV[i] to a predetermined threshold value K; and if the retrieved current count value CCV[i] is greater than the predetermined threshold value K, the VMM mapping the corresponding shadow memory page as large in the shadow page table structure.

21. The computer program product of claim 20, further comprising the VMM clearing the set access bits in the L1 page table after calculating the corresponding current count value CCV[i].

22. The computer program product of claim 20, wherein each L1 page table consists of 512 page table entries, and wherein:

the predetermined threshold value K is at least 320.

23. The computer program product of claim 18, wherein the current count value CCV[i] for a corresponding L1 page table is calculated by the VMM as a function of a previously calculated count value CCV[i−1] for the same L1 page table.

24. The computer program product of claim 23, wherein the current count value CCV[i] is calculated by the VMM according to the formula:

$$CCV[i]=(1-\alpha)*CCV[i-1]+\alpha*Nsa$$

where $0 \leq \alpha \leq 1$; and where CCV[i−1] is an immediately previous value of the current count value CCV.

25. The computer program product of 24, further comprising:

the VMM setting at least one of $\alpha$ and the predetermined threshold value K as a function of at least one of:

a number of page table entries in the L1 page table; and the other of $\alpha$ and the predetermined threshold value K.

26. The computer program product of claim 18, further comprising:

the VMM setting the first time period to be in a range of 60-300 seconds.

27. The computer program product of claim 26, further comprising:

the VMM periodically calculating and storing the current count value CCV[i] for each L1 page table at least 10-12 times during the first time period.

28. The computer program product of claim 18, further comprising:
the VMM setting a first value as a predetermined number of calculated count values CCV to be obtained during the first time period; and
the VMM spreading the calculation and storing of the predetermined number of calculated count values CCV for each L1 page table over the first time period.

* * * * *